(No Model.) 2 Sheets—Sheet 2.
T. V. JENSEN.
SHUTTER MECHANISM FOR CAMERAS.
No. 530,486. Patented Dec. 4, 1894.
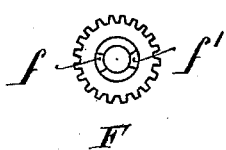
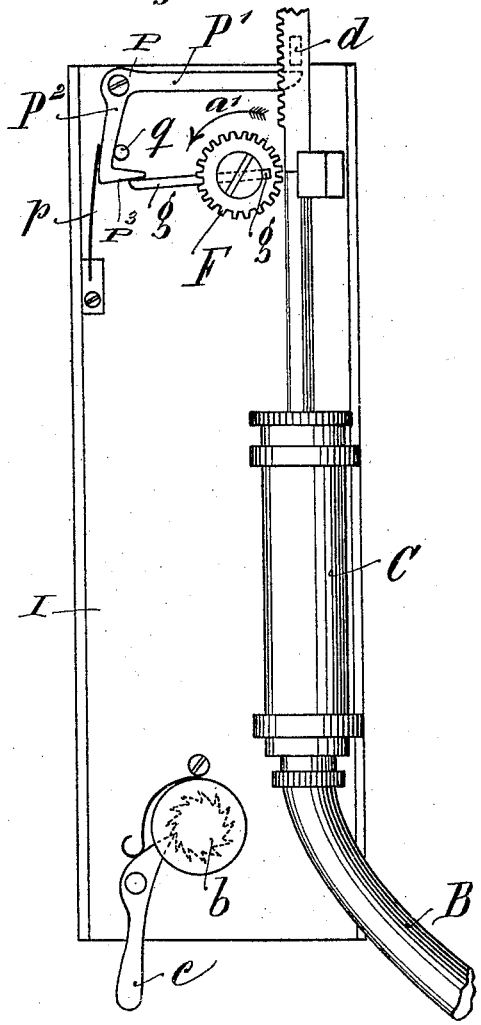
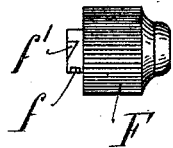
WITNESSES
INVENTOR:
ATTORNEYS

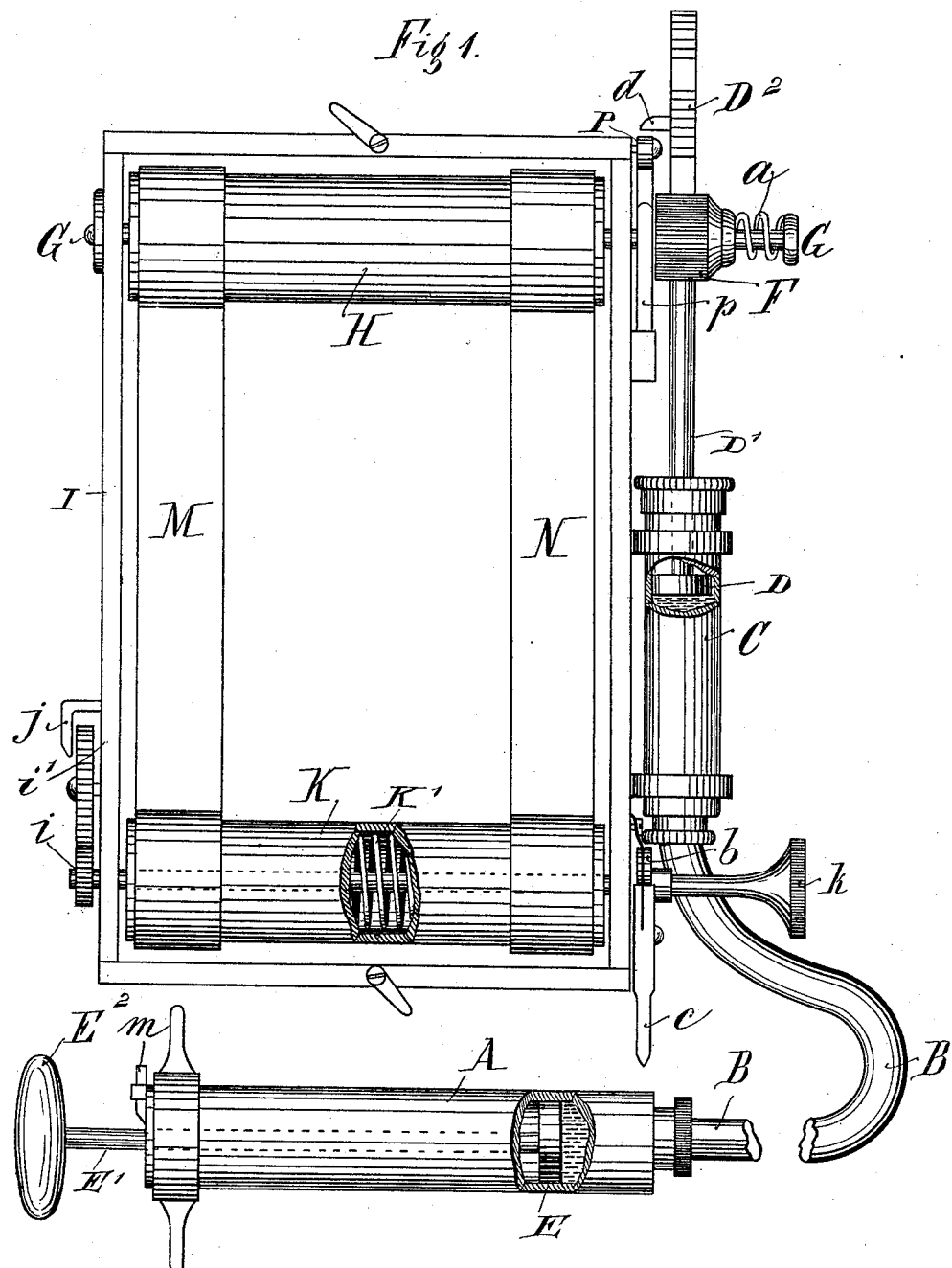

UNITED STATES PATENT OFFICE.

THEODOR VILHELM JENSEN, OF COPENHAGEN, DENMARK.

SHUTTER MECHANISM FOR CAMERAS.

SPECIFICATION forming part of Letters Patent No. 530,486, dated December 4, 1894.

Application filed August 16, 1894. Serial No. 520,497. (No model.)

*To all whom it may concern:*

Be it known that I, THEODOR VILHELM JENSEN, a subject of the King of Denmark, residing at Copenhagen, Denmark, have invented a new and Improved Shutter-Operating Mechanism for Cameras, of which the following is a full, clear, and exact description.

The invention relates to instantaneous photography, and its object is to provide a new and improved shutter operating mechanism which is comparatively simple and durable in construction, very effective and instantaneous in operation, and arranged to permit the operator to set and release the shutter without stepping in front of the camera.

The invention consists in certain parts and details, and combinations of the same, as will be hereinafter fully described and then pointed out in the claims.

Reference is to be had to the accompanying drawings, forming part of this specification, in which similar letters of reference indicate corresponding parts in all the views.

Figure 1 is a front elevation of the shutter with parts broken out. Fig. 2 is a side elevation of the same. Fig. 3 is a rear face view of the gear wheel; and Fig. 4 is a side elevation of the same.

The improved shutter operating mechanism is provided with a cylinder A, adapted to be taken hold of by the operator, and connected by a flexible tube B with a second cylinder C, attached on one side of the shutter casing or the camera casing I, as the case may be.

In the cylinder C operates a piston D, provided with a piston rod $D'$ provided on its outer end with a rack $D^2$, and in the other cylinder A is arranged a piston E held on a piston rod $E'$ carrying on its outer end a handle $E^2$, adapted to be taken hold of by the operator to move the piston E forward and backward in the cylinder A. The latter, the tube B and the cylinder C are filled with water or other liquid, so that the operator in moving the handle $E^2$, and consequently the piston E in the cylinder, causes a similar movement of the piston D in the cylinder C, owing to the hydraulic connections between the said pistons.

The rack $D^2$ on the piston rod $D'$ is adapted to mesh with a gear wheel F mounted to rotate loosely on a shaft G, journaled in suitable bearings in the casing I, and carrying within the latter a drum H, connected by belts or ropes N, N, or other similar means, with a second drum K mounted to turn on a shaft $k$, and containing a spring $K'$ fastened at one end to the said shaft, and at its other end to the said drum. A spring $a$ presses on the outer end of the gear wheel F, and on the rear face of the said gear wheel is arranged a hub having notches $f f'$ adapted to engage a pin $g$ held on the shaft G, so that when the gear wheel F is rotated in one direction the notches $f f'$ by engaging the pin $g$, carry the latter around to rotate the shaft G and drum H, and likewise the drum K by the connecting belts M, N, to wind up the spring $K'$ in the said drum.

The pin $g$ is adapted to be locked in place by a bell crank lever P, pivoted on one side of the casing I, the said bell crank lever being adapted to be engaged at its arm $P'$ by a lug $d$ secured on the rear of the rack $D^2$, and the other arm $P^2$ of the said bell crank lever being formed with a foot $P^3$, to engage the outer end of the pin $g$ at the time the piston D has moved in an uppermost position, and the lug $d$ has passed the arm $P'$. See Figs. 1 and 2. A spring $p$ presses on the arm $P^2$ to hold the foot $P^3$ in proper position for engagement with the pin $q$, the inward swinging movement of the said arm $P^2$ being limited by a stop pin $q$, held on the casing I.

On the shaft $k$ is secured a ratchet wheel $b$, adapted to be engaged by a spring pressed pawl $c$, to lock the said ratchet wheel and shaft $k$ in position. On the rear end of the shaft $k$ is secured a small pinion $i$, in mesh with an indicating gear wheel $i'$ journaled on the casing I, and formed on its face with a graduation on which indicates a pointer $j$, held on the casing I, to indicate the strength or winding power of the spring $K'$.

The operation is as follows: When the piston E is in an outermost position, the piston D is in a lowermost position, and when the operator pushes the knob $E^2$ so as to move the piston E inward, then the liquid in the cylinder A, tube B and cylinder C forces the piston D upward to cause the rack D² to engage and rotate the gear wheel F in the direction of the arrow a', whereby the drum H is revolved as previously described, and the drum K is likewise rotated and its spring K' wound up, and the shutter connected with either of the drums or the connecting belts M, N, is opened and again closed at the time the lug d has passed the arm P' and the foot P³ has moved in position as a stop for the pin g. The several parts are now locked in place, and when the operator now makes the exposure by withdrawing the slide of the plate holder, he then pulls on the knob E² to withdraw the piston E so that the piston D moves downward, and the lug d moves in engagement with the arm P', to swing the bell crank lever so as to move the foot P³ from the pin g to release or unlock the drums H, K, to permit the spring K' to rotate the drums in the opposite direction so as to readily open and close the shutter.

It is understood that when the spring K' exerts its power, then the gear wheel F is free to turn in an inverse direction of the arrow a', as the gear wheel F is free to move laterally on the shaft G, against the action of its spring a, to engage and disengage by its notches f f' the pin g. The notches f f', pin g and spring a constitute a clutch mechanism for connecting the gear wheel F and shaft G.

It is understood that on the releasing of the device and the return movement of the drums H, K, the shutters are rapidly opened and closed to make the necessary exposure. The speed of this return movement can be increased or diminished by the operator turning the shaft k to increase or decrease the tension of the spring K' and indicate by the pointer j on the graduated gear wheel i'.

In order to hold the shutter in an open position while focusing, I provide the cylinder A with a locking device m for the piston rod E', to hold the latter in such intermediate position that the shutter remains open.

Having thus described my invention, I claim as new and desire to secure by Letters Patent—

1. A shutter operating mechanism comprising a spring actuated drum mechanism, having an operating clutch mechanism through which the drum mechanism is rotated against the action of its spring, mechanism for locking the drum mechanism when under tension and a fluid operated piston acting in its forward movement to rotate the drum mechanism through the clutch against the action of the spring and in its return movement to release the said locking mechanism and permit the drum mechanism to be actuated by its spring, substantially as described.

2. A shutter operating mechanism comprising a spring actuated drum mechanism, a gear wheel having a clutch mechanism connecting it with the drum mechanism to operate the latter against the action of the spring, a lever for locking the drum mechanism against the action of its spring, and a fluid operated piston having a rack to engage the gear in its outward movement and having a projection or lug which on the return movement of the piston acts on said lever and releases the drum mechanism for action by its spring, substantially as described.

3. A shutter operating mechanism for cameras, comprising two cylinders connected with each other by a flexible tube, the latter as well as the cylinders being filled with a liquid, pistons moving in the said cylinders, one being controlled by the operator and the other being provided on its piston rod with a rack, a gear wheel adapted to receive an intermittent rotary motion from the said rack, a drum adapted to be rotated by the said gear wheel in one direction, and a second spring pressed drum connected with the first named drum, both being connected with the shutter proper, substantially as shown and described.

4. A shutter operating mechanism for cameras, comprising two cylinders connected with each other by a flexible tube, the latter as well as the cylinders being filled with a liquid, pistons moving in the said cylinders, one being controlled by the operator and the other being provided on its piston rod with a rack, a gear wheel adapted to receive an intermittent rotary motion from the said rack, a drum adapted to be rotated by the said gear wheel in one direction, a second spring pressed drum connected with the first named drum, both being connected with the shutter proper, a pin held on the shaft of the first named drum and adapted to engage notches in the hub of the said gear wheel, and a spring pressed locking lever for the said pin and adapted to be actuated by a lug on the said rack, substantially as shown and described.

5. A shutter operating mechanism for cameras, comprising two cylinders connected with each other by a flexible tube, the latter as well as the cylinders being filled with a liquid, pistons moving in the said cylinders, one being controlled by the operator and the other being provided on its piston rod with a rack, a gear wheel adapted to receive an intermittent rotary motion from the said rack, a drum adapted to be rotated by the said gear wheel in one direction, a second spring pressed drum connected with the first named drum, both being connected with the shutter proper, and means for regulating the tension of the springs in the said second drum, substantially as shown and described.

6. A shutter operating mechanism for cameras, comprising two cylinders connected with each other by a flexible tube, the latter as well as the cylinders being filled with a liquid, pistons moving in the said cylinders, one being controlled by the operator and the other being provided on its piston rod with a rack, a gear wheel adapted to receive an intermittent rotary motion from the said rack, a drum adapted to be rotated by the said gear wheel in one direction, a second spring pressed drum connected with the first named drum, both being connected with the shutter proper, and a device for indicating the tension of the spring in the said drum, substantially as shown and described.

THEODOR VILHELM JENSEN.

Witnesses:
P. HOFMAN-BANG,
P. KYSTER.